United States Patent
Ehara

(10) Patent No.: US 9,496,538 B2
(45) Date of Patent: Nov. 15, 2016

(54) BATTERY, PRODUCTION METHOD FOR BATTERY, AND MASK MEMBER FOR PRODUCTION OF BATTERY

(71) Applicant: Tsuyoshi Ehara, Toyota (JP)

(72) Inventor: Tsuyoshi Ehara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 561 days.

(21) Appl. No.: 13/923,684

(22) Filed: Jun. 21, 2013

(65) Prior Publication Data

US 2014/0004408 A1  Jan. 2, 2014

(30) Foreign Application Priority Data

Jun. 29, 2012  (JP) .................................. 2012-147897

(51) Int. Cl.
| | |
|---|---|
| *H01M 2/22* | (2006.01) |
| *H01M 2/30* | (2006.01) |
| *H01M 2/06* | (2006.01) |
| H01M 2/02 | (2006.01) |
| H01M 2/04 | (2006.01) |

(52) U.S. Cl.
CPC ................. *H01M 2/22* (2013.01); *H01M 2/06* (2013.01); *H01M 2/30* (2013.01); *H01M 2/0217* (2013.01); *H01M 2/0473* (2013.01); *Y10T 29/4911* (2015.01)

(58) Field of Classification Search
None
See application file for complete search history.

(56) References Cited

U.S. PATENT DOCUMENTS

| | | | | |
|---|---|---|---|---|
| 2004/0079738 | A1* | 4/2004 | Sakamoto | H01M 2/307 219/121.82 |
| 2011/0045345 | A1* | 2/2011 | Tsuchiya | H01M 2/22 429/179 |
| 2012/0055909 | A1* | 3/2012 | Miyake | B21K 25/00 219/121.64 |
| 2012/0058374 | A1* | 3/2012 | Aota | B23K 35/365 429/94 |

FOREIGN PATENT DOCUMENTS

| | | |
|---|---|---|
| JP | A-11-314189 | 11/1999 |
| JP | A-2009-283256 | 12/2009 |
| JP | A-2012-028246 | 2/2012 |
| JP | A-2013-222621 | 10/2013 |

* cited by examiner

*Primary Examiner* — Alix Eggerding
(74) *Attorney, Agent, or Firm* — Oliff PLC

(57) ABSTRACT

A battery includes: an electricity-generating element; an exterior; an external terminal member; a current-collecting terminal member having a first end which is connected to the electricity-generating element and a second end, which extends outward of the exterior; and a platy connection member that, outside the exterior, interconnects the current-collecting terminal member and external terminal member. In the welding between the connection member and an outer peripheral side end portion of a swaged portion in which the second end of the current-collecting terminal member has been swaged toward an insertion hole of the connection member, an acute angle between a connecting line connecting the weld portion to a center of the second end and a longitudinally extending center line of the lid member is greater than or equal to 45 degrees. A production method for the battery and a battery production-purposed mask are also provided.

8 Claims, 6 Drawing Sheets

LONGITUDINAL DIRECTION

BATTERY, PRODUCTION METHOD FOR BATTERY, AND MASK MEMBER FOR PRODUCTION OF BATTERY

BACKGROUND OF THE INVENTION

1. Field of the Invention

The invention relates to a battery, a production method for a battery, and a battery production-purposed mask member. More particularly, the invention relates to a technology of producing a battery terminal structure.

2. Description of Related Art

In a battery having a shape with cornered faces (hereinafter called as a square shape), an exterior houses an electricity-generating element of the battery. Within the exterior there are disposed current-collecting terminal members that extend through a wall of the exterior and protrude out of the exterior hath on a positive electrode terminal side and on a negative electrode terminal side. Inside the exterior, a first end of each current-collecting terminal member is electrically connected to the electricity-generating element, and outside the exterior, a second end of each current-collecting terminal member is electrically connected to a corresponding external terminal member. Therefore, electric power can be given and received between inside and outside the battery.

In some cases, platy connection members are used to electrically connect, outside the exterior, the second ends (outside ends) of the current-collecting terminal members to the external terminal members. There is a known technology of interconnecting the second end of a current-collecting terminal member and a connection member by swaging the second end of the current-collecting terminal member to an insertion hole formed in the connection member (see, for example, Japanese Patent Application Publication No. 2012-028246 (JP 2012-028246 A)).

When the second end of a current-collecting terminal member and a connection member are connected by swaging the second end of the current-collecting terminal member to the connection member as in JP 2012-028246 A, an outer peripheral side end portion of the swaged second end of the current-collecting terminal member, in some cases, is welded to the connection member in order to secure electric conductivity between the current-collecting terminal member and me connection member.

However, if, as shown in FIG. 6A, an imaginary line passing through a weld portion (i.e., portions that are to be welded or that have been welded) W on the outer peripheral side end portion of the second end of the current-collecting terminal member and a center O of the second end of the current-collecting terminal member is more closely leaned to the longitudinal direction of a lid member of the battery than the lateral direction of the lid member of the battery, that is, if, in FIG. 6A, the acute angle α between a line L0 and a center line Lc is relatively small, thermal shrinkage at the time of welding causes tensile stress in the connection member in the longitudinal direction of the Sid member as show by arrows F and F in FIG. 6B. Here, the line L0 connects a weld portion W of the current-collecting terminal member and a center O of the second end of the current-collecting terminal member. The center line Lc extends in the longitudinal direction of the lid member. This causes a force that pivots the connection member in the direction of an arrow R in FIG. 6B, bending the connection member as indicated by a two-dot chain line. If such a bend occurs on the connection member, mere is possibility of occurrence of a problem or inconvenience in which when a bus bar or the like is attached to the external terminal member in a later process, the bus bar or the like cannot be fastened by a nut.

SUMMARY OF THE INVENTION in view of the aforementioned circumstances, the invention provides a battery in which an outer peripheral side end portion of a swaged second end of a current-collecting terminal member is welded to a connection member and in which occurrence of bend of the connection member can be restrained by reducing the tensile stress that is caused in the connection member in the longitudinal direction of a lid member by thermal shrinkage at the nine of welding. The invention also provides a production method for a battery and a battery production-purposed mask member which also achieve the above-indicated effect.

The task to be solved by the invention is as has been described above. Now, a battery, a production method for a battery and a battery production-purposed mask member for solving the task will be described below According to one aspect of the invention, there is provided a battery that includes an electricity-generating element, a housing member, a lid member, an external terminal member, a current-collecting terminal member and a connection member. The connection member is connected to the current-collecting terminal member. The current-collecting terminal member has a swaged portion and a weld portion. At the swaged portion, a second end of the current-collecting terminal member is swaged toward an insertion hole of the connection member. The weld portion is provided between an outer peripheral side end portion of the swaged second end of the current-collecting terminal member and the connection member. An acute angle between a connecting line connecting the weld portion to a center of the second end and a longitudinally extending center line of the lid member is greater than or equal to 45 degrees. In this construction, the housing member houses therein the electricity-generating element. The housing member is a bottomed tubular member having a square shape. The lid member is a rectangular member having a through hole. The lid member closes an open face of the housing member. The external terminal member is protruded outward from the lid member. The current-collecting terminal member is a member having a first end of which is provided in the housing member and is connected to the electricity-generating element, and a second end of which is cylindrical and is inserted through the through hole. The current-collecting terminal member extends outward of the lid member. The connection member is a platy member interconnecting the current-collecting terminal member and the external terminal member outside the lid member, and the connection member has an insertion hole through which the second end of the current-collecting terminal member is inserted.

According to another aspect of the invention, there is provided a production method for a battery that includes an electricity-generating element, a housing member, a lid member, an external terminal member, a current-collecting terminal member and a connection member. The connection member is connected to the current-collecting terminal member. The current-collecting terminal member has a swaged portion and a weld portion. At the swaged portion, a second end of the current-collecting terminal member is swaged toward the insertion hole of the connection member. The weld portion is provided between an outer peripheral side end portion of the swaged second end of the current-collecting terminal member and the connection member. In this construction, the housing member houses therein the electricity-generating element. The housing member is a bottomed tubular member having a square shape. The lid member is a rectangular member having a through hole. The lid member closes an open face of the housing member. The external terminal member is protruded outward from the lid member. The current-collecting terminal member is a member having a first end of which is provided in the housing member and is connected to the electricity-generating element, and a second end of which is cylindrical and is inserted through the through hole. The current-collecting terminal member extends outward of the lid member. The connection member is a platy member interconnecting the current-collecting terminal member and the external terminal member outside the lid member, and the connection member has an insertion hole through which the second end of the current-collecting terminal member is inserted. In this production method, a battery production-purposed mask member that has a circular hole that is larger in diameter by a predetermined amount than the swaged second end of the current-collecting terminal member is placed on the lid member, in such a placement manner that the swaged second end of the current-collecting terminal member is exposed through the circular hole. By this placement, a portion of the lid member that excludes a portion surrounding or adjacent to the swaged second end of the current-collecting terminal member is covered with the battery production-purposed mask member, and the outer peripheral side end portion of the swaged second end of the current-collecting terminal member is welded to the connection member.

In the production method for the battery, an acute angle between a connecting line and a longitudinally extending center line of the lid member may be greater than or equal to 45 degrees. Here, the connecting line connects the weld portion and a center of the second end.

Furthermore, in the production method for the battery, the current-collecting terminal member may include a plurality of the weld portions that are provided apart from each other on the outer peripheral side end portion of the second end of the current-collecting terminal member.

According to still another aspect of the invention, there is provided a battery production-purposed mask member for production of a battery that includes an electricity-generating element, a housing member, a lid member, an external terminal member, a current-collecting terminal member and a connection member. The connection member is connected to the current-collecting terminal member. The current-collecting terminal member has a swaged portion and a weld portion. At the swaged portion, a second end of the current-collecting terminal member is swaged toward the insertion hole of the connection member. The weld portion is provided between an outer peripheral side end portion of the swaged second end of the current-collecting terminal member and the connection member. This battery production-purposed mask member has a circular hole that is larger in diameter by a predetermined amount than the swaged second end of the current-collecting terminal member, and the battery production-purposed mask member does not cover a portion surrounding or adjacent to the swaged second end of the current-collecting terminal member of the lid member and covers a portion that excludes the portion surrounding or adjacent to the swaged second end of the current-collecting terminal member of the lid member when the battery production-purposed mask member is placed on the lid member. In this aspect, the housing member houses therein the electricity-generating element. The housing member is a bottomed tubular member having a square shape. The lid member is a rectangular member having a through hole. The lid member closes an open face of the housing member. The external terminal member is protruded outward from the lid member. The current-collecting terminal member is a member having a first end of which is provided in the housing member and is connected to the electricity-generating element, and a second end of which is cylindrical and is inserted through the through hole. The current-collecting terminal member extends outward of the lid member. The connection member is a platy member interconnecting the current-collecting terminal member and the external terminal member outside the lid member, and the connection member has an insertion hole through which the second end of the current-collecting terminal member is inserted.

Furthermore, in the battery production-purposed mask member for production of the battery, an acute angle between a connecting line and a longitudinally extending center line of the lid member may be greater than or equal to 45 degrees, the connecting line connecting the weld portion to a center of the second end.

In the battery production-purposed mask member, the current-collecting terminal member may include a plurality of the weld portions that are provided apart from each other on the outer peripheral side end portion of the second end of the current-collecting terminal member.

According to the invention, in a battery in which an outer peripheral side end portion of a swaged second end of a current-collecting terminal member is welded to a connection member, occurrence of bend of the connection member can be restrained by reducing the tensile stress that is caused in the connection member in the longitudinal direction of a lid member by thermal shrinkage at the time of welding.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION

Figure 1A:
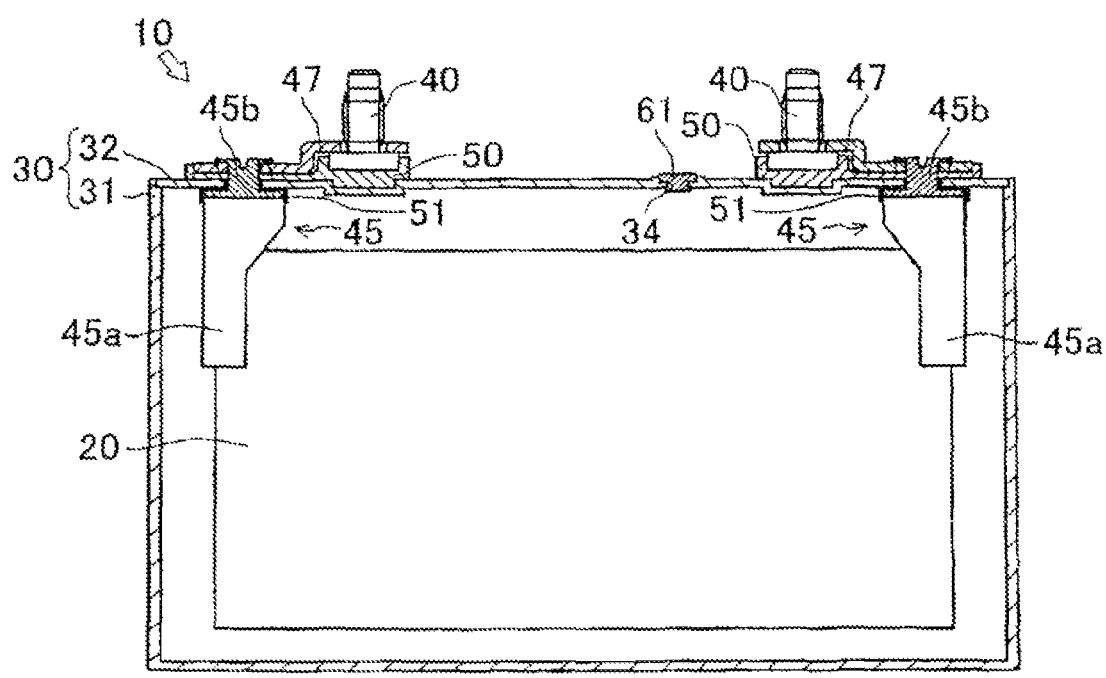
FIG. 1A is an elevation sectional view showing a general construction of a battery in accordance with an embodiment of the invention.
Figure 1B:
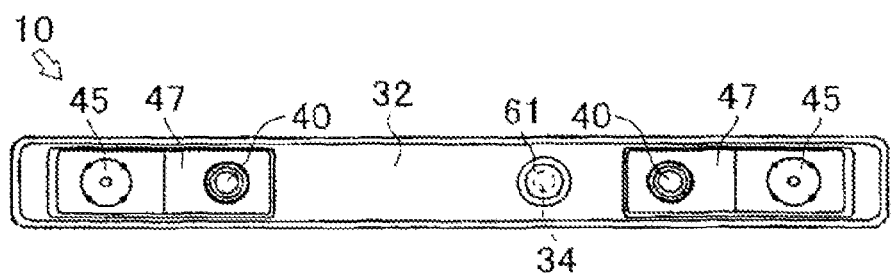
FIG. 1B is a plan view of the battery shown in FIG. 1A.

Embodiments of the invention will be described. It is to be noted that the technical scope of the invention is not limited to the following embodiments, but broadly covers the entire scope of the technical idea intended truly by the invention which becomes apparent from what is described and shown in the specification and the drawings.

With reference to FIGS. 1A and 1B and FIGS. 3A and 3B, a general construction of a battery 10 that is an embodiment of a sealed battery in accordance with the invention will be described. The battery 10 of this embodiment is a lithium-ion secondary battery. The battery 10 includes, as main component elements: an electricity-generating element 20; an exterior 30 in which the electricity-generating element 20 is housed; external terminal members 40 and 40 that protrude out from the exterior 30; insulation members 50 and 50 that are resinous lid members interposed between the external terminal members 40 and 40 and the exterior 30; current-collecting terminal members 45 and 45 an end (first end) of each of which is connected to the electricity-generating element 20 and another end (second end) of each of which extends out of the exterior 30; insulation members 51 and 51 that are resinous lid members interposed between the current-collecting terminal members 45 and 45 and the exterior 30; and platy connection members 47 and 47 that connect, outside the exterior 30, the current-collecting terminal members 45 and 45 to the external terminal members 40 and 40.

The electricity-generating element 20 is an electrode assembly formed by laminating or rolling a positive electrode, a negative electrode and separators together and impregnated with an electrolytic solution. When the battery 10 is charged or discharged, electric current is produced by chemical reactions occurring in the electricity-generating element 20 (more specifically, migration of ions between the positive electrode and the negative electrode via the electrolytic solution).

The exterior 30 is a prismatic (rectangular prism-shaped) can that has a housing member 31 and a lid member 32 that are both made of metal. The housing member 31 is a a bottomed tubular member having a square shape, a face of which is open, and the housing 31 houses therein the electricity-generating element 20. The lid member 32 is a flat platy rectangular member having a configuration commensurate with the open face of the housing member 31, and is joined to the housing member 31 so as to close the opening face of the housing member 31.

Figure 3A:
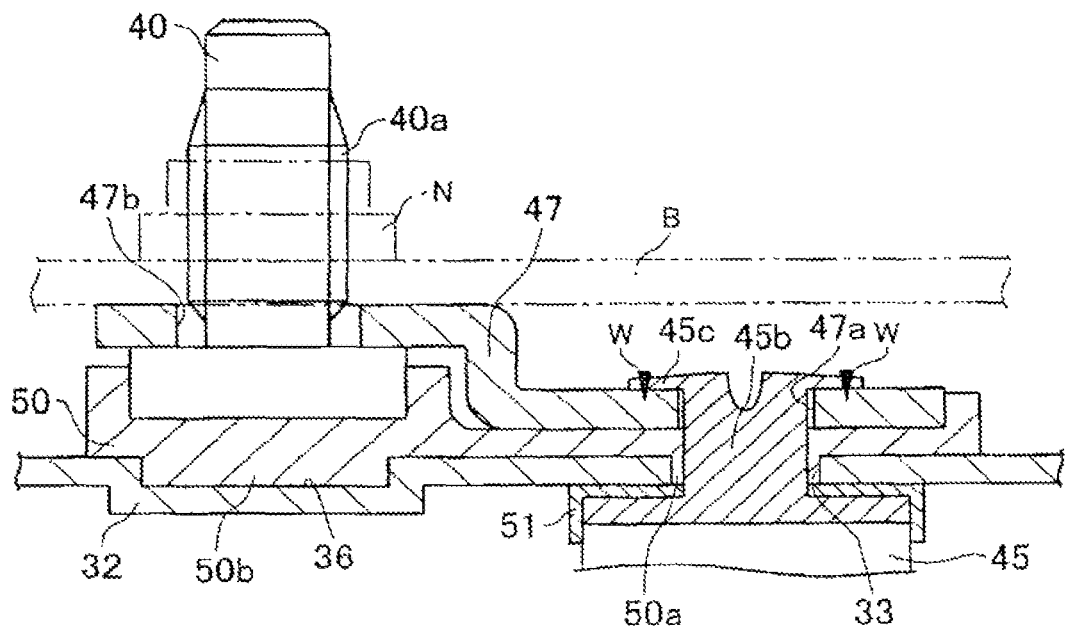
FIG. 3A is an enlarged sectional view of a portion of the battery that includes a terminal.

As shown in FIG. 3A, the lid member 32 of the exterior 30 has through holes 33 and 33 through which the second ends of the current-collecting terminal members 45 and 45 (upper ends thereof in this embodiment) can be inserted. The through holes 33 and 33 are holes having a predetermined inside diameter, and extend through a wall of the exterior 30 (the lid member 32) in its thickness direction.

Furthermore, the lid member 32 has on its outside surface (an upper surface in FIG. 3A) rotation stopper groves 36 and 36 that are formed adjacent to the through holes 33 and 33, as shown in FIG. 3A. More particularly, rectangular grooves of downward depression are formed as rotation stopper grooves 36 and 36 in the lid member 32, at locations near the through holes 33 and 33.

A pour hole 34 is formed relatively near the center of the lid member 32, between the rotation stopper grooves 36 and 36. The pour hole 34 is a through hole having a predetermined inside diameter, and extends through the lid member 32 in the thickness direction of the lid member 32. The pour hole 34 is used to pour an electrolytic solution into the exterior 30 in which the electricity-generating element 20 has been housed. The pour hole 34 is sealed with a seal member 61 after the electrolytic solution is poured in.

The insulation members 50 and 50 each include a tubular gasket portion 50a that is inserted into a corresponding one of the through holes 33 and 33, and a rotation stopper portion 50b that is formed so as to have generally the same shape as the rotation stopper grooves 36 and 36 and be fixed into a corresponding one of the rotation stopper grooves 36 and 36. Then, by wrapping the perimeters of the current-collecting terminal members 45 and 45 with the tubular gasket portions 50a and 50a, respectively, the lid member 32 of the exterior 30 is electrically insulated from the current-collecting terminal members 45 and 45. In other words, the current-collecting terminal members 45 and 45 are inserted into the gasket portions 50a and 50a of the insulation members 50 and 50, and extend through the through holes 33 and 33.

The insulation members 51 and 51 are disposed on an upper side of the current-collecting terminal members 45 and 45 so as to electrically insulate the lid member 32 of the exterior 30 and the current-collecting terminal members 45 and 45 from each other. As for materials of the insulation members 50 and 50 and the insulation members 51 and 51, a preferable material is a material excellent in high-temperature creep property, that is, a material having a long-period creep resistance to the cooling/heating cycles of the battery 10, and examples of such a material include PEEK (polyether ether ketone) and the like.

The external terminal members 40 and 40 are columnar members which are disposed on the insulation members 50 and 50 so that an end of each columnar member (an upper end thereof in this embodiment) is protruded outward from an upper surface of the lid member 32. The external terminal members 40 and 40 are electrically connected to the positive electrode and the negative electrode of the electricity-generating element 20 via the current-collecting terminal members 45 and 45, respectively. The external terminal members 40 and 40 and the current-collecting terminal members 45 and 45 function as a current-carrying path for extracting electric power stored in the electricity-generating element 20 or inputting electric power from outside into the electricity-generating element 20. Each of the external terminal members 40 and 40 has in its outwardly protruded portion a bolt portion 40a (see FIG. 3A) that has been threaded by a thread-rolling process.

An end (first end) 45a of each of the current-collecting terminal members 45 and 45 (a lower end thereof in this embodiment) is connected to the positive electrode plate or the negative electrode plate of the electricity-generating element 20. Furthermore, another end (second end) 45b of each current-collecting terminal member 45 (an upper end thereof in this embodiment), is cylindrical, and is inserted through a corresponding one of the through holes 33 and 33 of the lid member 32 and is protruded out (upward) from the lid member 32. As for materials of the current-collecting terminal members 45 and 45, for example, aluminum and copper may be used for the positive electrode-side member and the negative electrode-side member, respectively.

Figure 3B:
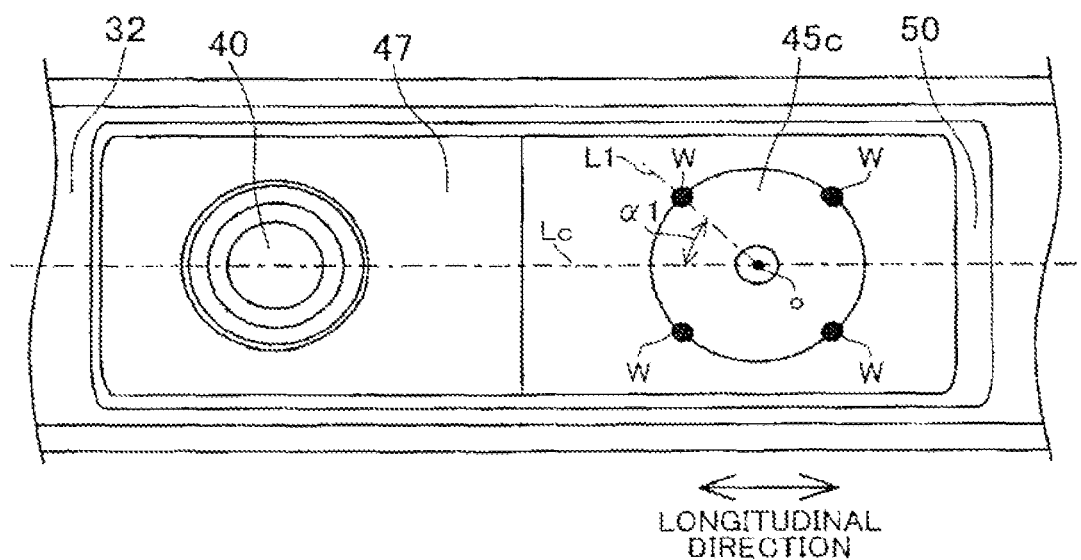
FIG. 3B is an enlarged plan view of a portion of the battery that includes the terminal.

The connection members 47 and 47 are electroconductive platy members that have a crank shape in a side sectional view as shown in FIG. 3A. Each connection member 47 has an insertion hole 47a and an external terminal hole 47b both of which extend in the thickness direction of the connection member 47. Since the two connection members 47 and 47 and their adjacent structures are substantially identical (or symmetric) to each other, description below will sometimes be made with regard to only one of the connection members 47. The second end 45b of the current-collecting terminal member 45 is inserted into the insertion hole 47a, and is swaged to the insertion hole 47a so that the connection member 47 and the current-collecting terminal member 45 are interconnected. The second end 45b of each current-collecting terminal member 45 is swaged so as to spread in a circular disc shape as shown in FIGS. 3A and 3B. Hereinafter, the circular disc-shaped portion of the second end 45b of each current-collecting terminal member 45 is termed the swaged portion 45c. In order to secure electro-conductivity between the current-collecting terminal member 45 and the connection member 47, an outer peripheral side end portion of the swaged portion 45c of the current-collecting terminal member 45 is welded to the connection member 47.

Furthermore, the external terminal member 40 is inserted through the external, terminal hole 47b of the connection member 47. Then, a bus bar B through which the external terminal member 40 penetrates is placed on an upper surface of the connection member 47, and a nut N is fastened to the bolt portion 40a of the external terminal member 40 from above the bus bar B. In this manner, the connection member 47 and the external terminal member 40 are connected together. That is, the current-collecting terminal member 45 and the external terminal member 40 are interconnected by the connection member 47 on the outside of the lid member 32.

Next, a method in which the outer peripheral side end portion of the swaged portion 45c formed on the second end 45b of the current-collecting terminal member 45 is welded to the connection member 47 in order to secure electroconductivity between the current-collecting terminal member 45 and the connection member 47 will be described with reference to FIGS. 2A and 2B.

The battery 10 is covered with a battery production-purposed mask member 70 (i.e., a mask member 70 for use at the time of production of the battery) formed by a platy member in advance before the swaged portions 45c of the current-collecting terminal members 45 are welded to the connection members 47. As shown in FIGS. 2A and 2B, the battery production-purposed mask member 70 has, in its portions that correspond to the swaged portions 45c, two circular holes 71 that are larger in diameter by a predetermined amount than the swaged portions 45c. Then, the battery production-purposed mask member 70 is placed on the lid member 32 so that the swaged portion 45c of each current-collecting terminal member 45 is exposed through a corresponding one of the circular holes 71. That is, a portion of the lid member 32 that excludes the swaged portions 45c and portions adjacent to and surrounding the swaged portions 45c is covered with the battery production-purposed mask member 70. As for the configuration of the battery production-purposed mask member 70, a generally central portion is protruded upward (i.e., dented upward as shown in FIG. 2A) so that the battery production-purposed mask member 70 does not interfere with the external terminal members 40 or the like.

Figure 2A:
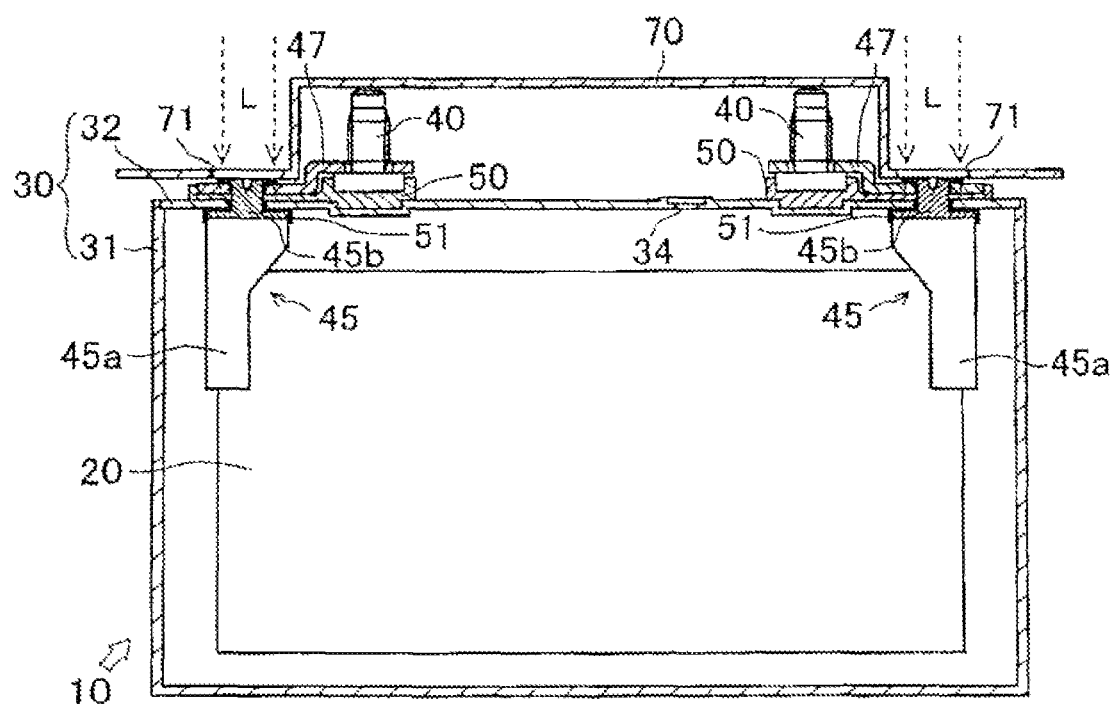
FIG. 2A is an elevation sectional view showing the battery covered with a mask member
Figure 2B:
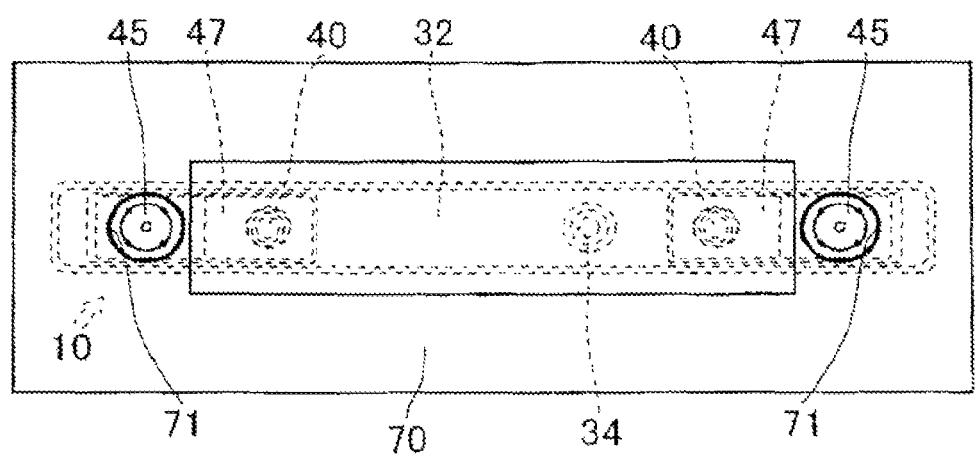
FIG. 2B is a plan view of the battery covered with the mask member.

After the battery 10 is covered with the battery production-purposed mask member 70 in the above-described manner, the outer peripheral side end portion of the swaged portion 45c of each current-collecting terminal member 45 is welded to the connection member 47 by laser welding as shown by arrows L in FIG. 2A. According to this embodiment, the construction described above prevents an undesired event in which when sputtering occurs at the time of welding, sputtered metal scatters (balls of molten metal fly in various directions) and deposits on the pour hole 34 and the like. That is, the construction prevents, for example, an event in which sputtered metal closes or blocks the pour hole 34 so that in a later processing step, the electrolytic solution cannot be poured in and an event in which sputtered metal deposits on a peripheral edge portion of the pour hole 34, so that after the electrolytic solution poured in, the pout hole 34 cannot be sealed with the seal member. Incidentally, this embodiment has four weld portions (the term "weld portion" herein refers to a portion that is to welded or that has been welded) W between the swaged portion 45c of each current-collecting terminal member 45 and the corresponding connection member 47 as shown in FIG. 2A and FIG. 3B. However, if a certain area of welding secured by the weld portion or portions W, the number of weld portions W is not limited.

Furthermore, in the embodiment, the outer peripheral side end portion of the swaged portion 45c of a current-collecting terminal member 45 is welded to the connection member 47 so that, as shown in FIG. 3B, the acute angle α between a connecting line L1 connecting a weld portion W of the outer peripheral side end portion of the swaged portion 45c and a center O of the second end of the current-collecting terminal member and a center line Lc extending in the longitudinal direction of the lid member 32 is greater than or equal to 45 degrees. In other words, it is intended that the weld portions W will be sufficiently apart from the center line Lc of the second end 45b by & design in which the angle between the connecting line L1 connecting the weld portion W and the center O of the second end 45b and the center line Lc is greater than or equal to 45 degree. In this manner, the welding is carried out so that an imaginary line passing through the weld portion W on the outer peripheral side end portion of the second end of the current-collecting terminal member 45 and the center O of the second end of the current-collecting terminal member is not closely leaned to the longitudinal direction of the lid member 32.

According to this embodiment, the above-described construction will reduce the tensile stress that is caused in the connection member 47 in the longitudinal direction of the lid member 32 if thermal shrinkage occurs at the time of welding. That is, force that rotates the connection member 47 in the longitudinal direction does not occur, so that the connection member 47 will not bend upward. More specifically, since the connection member 47 does not undergo such a bend, there does not occur a problem in which when the bus bar B or the like is attached to the external terminal members 40 in a later processing step, the bus bar B or the like cannot be firmly attached by tightening the nut N. Incidentally, although in this embodiment, laser welding is preformed after the battery 10 is covered with the battery production-purposed mask member 70 as described above, it is also possible to adopt a construction in which laser welding is performed without using a battery production-purposed mask member 70.

Figure 4:
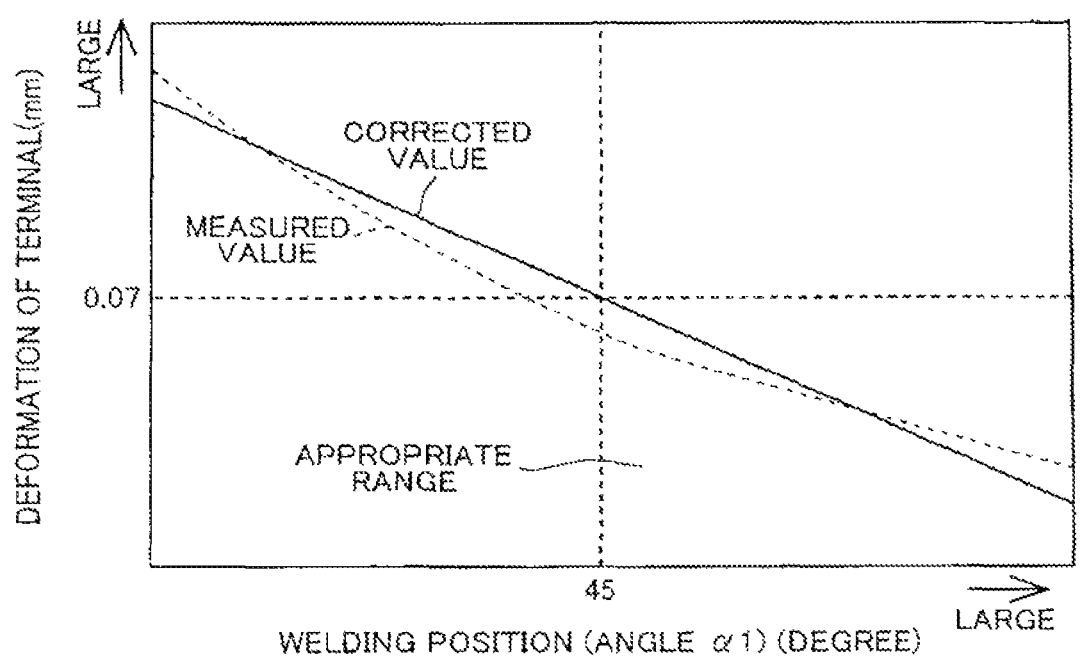
FIG. 4 is a diagram showing a relationship between the position of welding and the amount of deformation of the terminal.

A graph shown in FIG. 4 shows a relation between the size of the acute angle α1 (welding position) formed between the connecting line L1 and the center line Lc and the amount of deformation of the terminal of the connection member 47. In FIG. 4, an interrupted line represents actually measured values, and a solid line represents corrected values of the measured values. As shown in FIG. 4, in terms of the corrected value, the greater the welding position α1, the smaller the amount of deformation of the terminal was able to be made. It is to be noted herein that if the permissible value of the amount of deformation of the terminal is less than or equal to 0.07 mm, the welding position α1 needs to be greater than or equal to 45 degrees. Because of this, this embodiment has a construction in which the acute angle α1 between the connecting line L1 and the center line Lc is greater than or equal to 45 degrees.

Figure 5A:
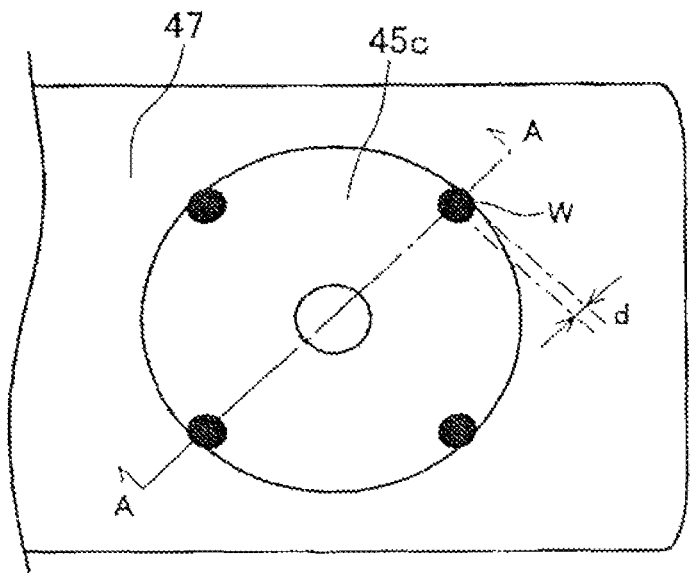
FIG. 5A is an enlarged plan view of a current-collecting terminal member of the battery.
Figure 5B:
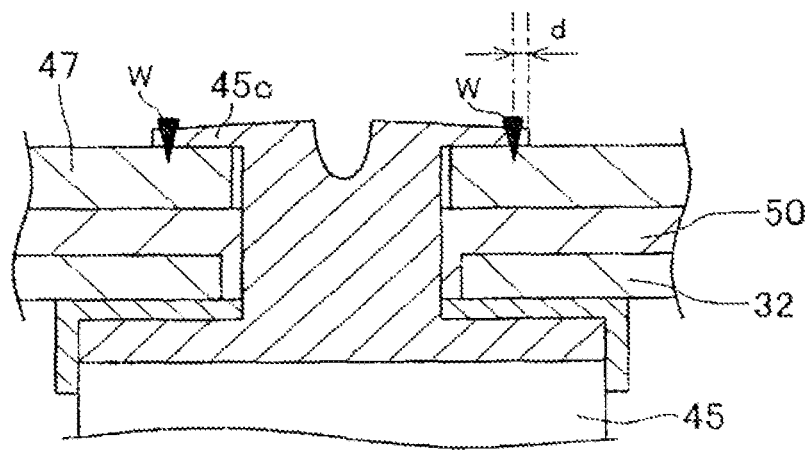
FIG. 5B is an enlarged sectional view of the current-collecting terminal member of the battery.
Figure 6A:
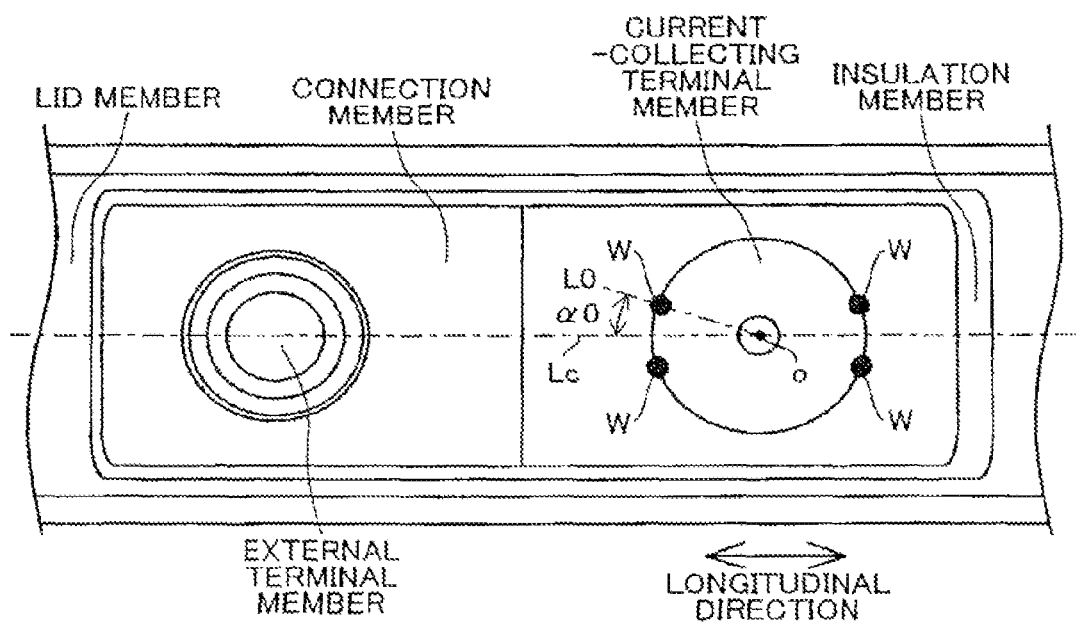
FIG. 6A is an enlarged plan view of a portion of a battery that includes a terminal in accordance with a related art.
Figure 6B:
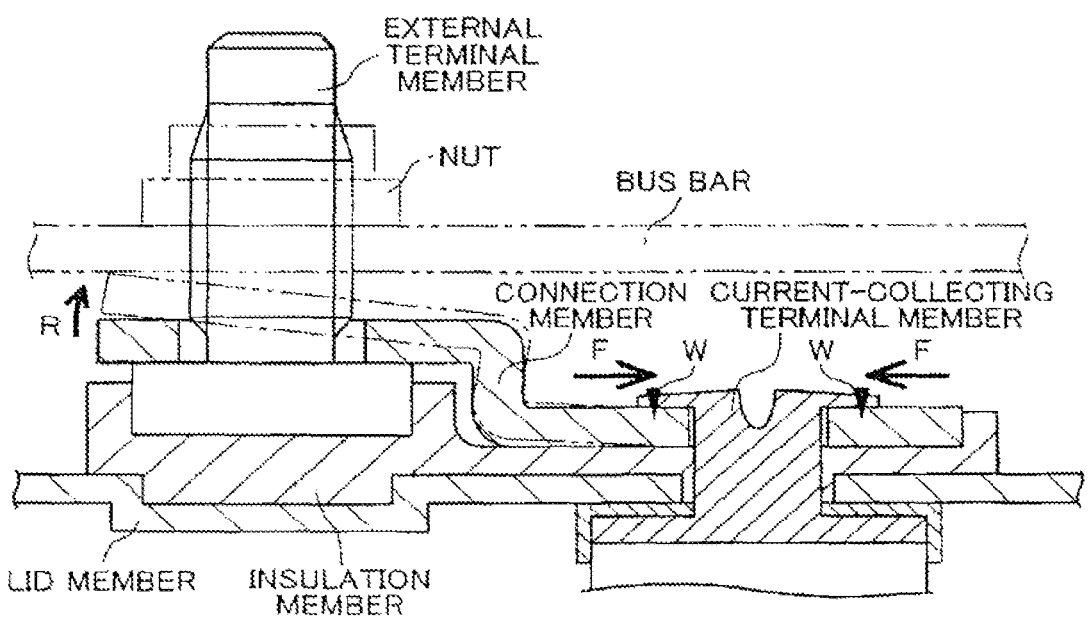
FIG. 6B is an enlarged sectional view of the portion of the battery that includes the terminal in accordance with the related art.

Furthermore, in the embodiment, the distance d (see FIGS. 5A and 5B) between an outer peripheral side end of the swaged portion 45c and each weld portion W (more accurately, the center of each weld portion W) is within a predetermined range. Concretely, the position of the outer peripheral side end of the swaged portion 45c is detected by image inspection, and the laser irradiation position in the laser welding process is calculated so that the distance d is greater than or equal to 0.4 mm and is less than or equal to 0.6 mm. On the basis of this calculation, the laser welding is performed.

According to the embodiment, the above-described construction secures a certain quality of welding. Concretely, it is possible to prevent an event in which because of a small distance d, the amount of energy given to the connection member 47 at the time of laser welding becomes large so that laser penetrates the connection member 47. Furthermore, it is possible to prevent an event in which because of a great distance d, the amount of energy given to the connection member 47 at the time of laser welding becomes small so that an insufficiently welded portion results.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A battery comprising:
   an electricity-generating element;
   a housing member housing the electricity-generating element;
   a lid member having a through hole, the lid member closing an open face of the housing member;
   an external terminal member protruding outward from the lid member;
   a current-collecting terminal member having a first end and a second end,
   the first end being disposed in the housing member and connected to the electricity-generating element,
   the second end being disposed through the through hole, and
   the current-collecting terminal member extending outward of the lid member; and
   a connection member that is a platy member interconnecting the current-collecting terminal member and the external terminal member outside the lid member,
   the connection member having an insertion hole such that the second end of the current-collecting terminal member is inserted through the insertion hole, and
   the connection member being connected to the current-collecting terminal member,
   wherein:
   the current-collecting terminal member has a swaged portion and a plurality of weld portions such that the second end of the current-collecting terminal member is swaged toward the insertion hole of the connection member at the swaged portion, the weld portions being disposed between an outer peripheral end of the swaged portion and the connection member, and
   the weld portions are spaced apart from each other such that connecting lines, each of which extends through a weld portion of the plurality of weld portions and a center of the second end of the current collecting terminal member, form an acute angle with a longitudinally extending center line of the lid member, each of the acute angles being greater than or equal to 45 degrees.

2. A production method for a battery, the battery including:
   an electricity-generating element;
   a housing member housing the electricity-generating element;
   a lid member having a through hole, the lid member closing an open face of the housing member;
   an external terminal member protruding outward from the lid member;
   a current-collecting terminal member having a first end and a second end,
   the first end being disposed in the housing member and connected to the electricity-generating element,
   the second end being disposed through the through hole, and
   the current-collecting terminal member extending outward of the lid member; and
   a connection member that is a a platy member interconnecting the current-collecting terminal member and the external terminal member outside the lid member,
   the connection member having an insertion hole such that the second end of the current-collecting terminal member is inserted through the insertion hole, and
   the connection member being connected to the current-collecting terminal member,
   wherein:
   the current-collecting terminal member has a swaged portion and a plurality of weld portions such that the second end of the current-collecting terminal member is swaged toward the insertion hole of the connection member at the swaged portion, the weld portions being disposed between an outer peripheral end of the swaged portion and the connection member, and
   the weld portions are spaced apart from each other such that connecting lines, each of which extends through a weld portion of the plurality of weld portions and a center of the second end of the current collecting terminal member, form an acute angle with a longitudinally extending center line of the lid member, each of the acute angles being greater than or equal to 45 degrees,
   the method comprising:
   placing a battery production-purposed mask member on the lid member, the battery production-purposed mask member having a circular hole that is larger in diameter by a predetermined amount than the swaged second end of the current-collecting terminal member, in such a placement manner that the swaged second end of the current-collecting terminal member is exposed through the circular hole; and
   welding the outer peripheral end of the swaged portion to the connection member while a portion of the lid member is covered with the battery production-purposed mask member, the portion of the lid member excluding a portion surrounding or adjacent to the swaged second end of the current-collecting terminal member.

3. The production method for the battery according to claim 2, wherein the plurality of weld portions are spaced apart from each other on the outer peripheral end of the swaged portion.

4. The battery according to claim 1, further including an insulating member disposed at least partially between the connection member and the lid member.

5. The battery according to claim 1, wherein the connecting lines extend through all the weld portions.

6. The battery according to claim 1, wherein all the weld portions are provided at an angle of greater than 45 degrees with regard to the longitudinally extending center line of the lid member.

7. The battery according to claim 2, wherein the connecting lines extend through all the weld portions.

8. The battery according to claim 2, wherein all the weld portions are provided at an angle of greater than 45 degrees with regard to the longitudinally extending center line of the lid member.

* * * * *